United States Patent [19]

Ebata

[11] Patent Number: 4,974,768
[45] Date of Patent: Dec. 4, 1990

[54] SOLDERING IRON TIP

[75] Inventor: Makoto Ebata, Tokyo, Japan

[73] Assignee: Mitsui Engineering & Shipbuilding Co., Ltd., Tokyo, Japan

[21] Appl. No.: 511,948

[22] Filed: Apr. 16, 1990

Related U.S. Application Data

[63] Continuation of Ser. No. 308,347, Feb. 8, 1989, abandoned.

[30] Foreign Application Priority Data

Feb. 22, 1988 [JP] Japan .................................. 63-39173

[51] Int. Cl.⁵ ............................................... B23K 3/02
[52] U.S. Cl. ........................................ 228/54; 148/403
[58] Field of Search ............................ 228/54, 51, 55; 219/229; 76/DIG. 6, DIG. 10; 148/403

[56] References Cited

U.S. PATENT DOCUMENTS 3,315,350  4/1967  Kent .
4,424,930  1/1984  Wilhelmson .......................... 228/54

FOREIGN PATENT DOCUMENTS 718104   2/1942  Fed. Rep. of Germany ........ 228/54
7530792  9/1975  Fed. Rep. of Germany .
1250414  8/1986  U.S.S.R. ................................. 228/54

Primary Examiner—Sam Heinrich
Attorney, Agent, or Firm—Kanesaka and Takeuchi

[57] ABSTRACT

A soldering iron tip comprises a coating layer of amorphous metal satisfactory in wettability in molten solder formed on the leading end part thereof. A soldering iron tip may comprise a coating layer of amorphous metal low in wettability in molten solder formed on at least the leading end part thereof and a coating layer of material excellent in wettability in molten solder formed on the coating layer of amorphous metal on the leading end part.

8 Claims, 3 Drawing Sheets

SOLDERING IRON TIP

This application is a continuation, of application Ser. No. 308,347, filed Feb. 8, 1989, now abandoned.

FIELD OF THE INVENTION AND RELATED ART STATEMENT

This invention relates to a soldering iron tip, and more particularly to a soldering iron tip having notably improved (corrosion resistance.)

The soldering iron has a soldering iron tip attached to the leading end of a soldering iron proper incorporating therein a heater. As illustrated in FIG. 6, a conventional soldering iron tip 10 has a soldering iron proper 11 thereof made of copper (oxygen-free copper) for the sake of the heater's electroconductivity. For the purpose of (providing wettability in solder) to the soldering iron tip and preventing the soldering iron tip of copper from material deterioration due to oxidation of copper at elevated temperature, the leading end of the soldering iron is covered with an iron (pure iron) plating 12 having a thickness in the range of 0.5 to 1 mm. The soldering iron except for the leading end is covered with a chromium (hard chromium) plating (coating layer) 13 for the purpose of preventing molten solder from spreading over and creeping up the surface of the soldering iron tip 10.

The extremity of the soldering iron tip 10 is required to possess ample wettability in molten solder and permit steady adhesion of molten solder. The metals which exhibit best wettability in molten solder are gold and silver. Since these metals are expensive, iron which is inexpensive and exhibits relatively satisfactory wettability in molten solder is generally employed from the economic point of view. The iron plating 12 provides an additional function of preventing the soldering iron proper 10 of copper from being corroded by the reaction of its own copper with Sn contained in the solder. Incidentally when copper directly contacts the molten solder, it reacts with Sn and terminates its service life in 2 to 3 hours. Owing to the presence of the iron plating, however, the service life can be elongated to a level in the range of two or three days to one week.

The soldering iron tip 10 except for the leading end thereof is required to exhibit poor wettability in molten solder for the purpose of preventing molten solder from creeping up the soldering iron wastefully and degrading the workability of the soldering iron itself. Thus, it is covered with the chromium plating 13 which exhibits poor wettability in molten solder.

The solder to be used for soldering is formed mainly of a Pb-Sn alloy. For the purpose of improving the solder composition in wettability, spreadability, and soldering property, the solder composition incorporates therein a flux and generally contains chlorine in a concentration in the range of 0.1 to 0.8%.

The conventional soldering iron tip which is covered with an iron plating has the following problem and fails to acquire sufficient corrosion resistance or durability.

Since the iron plating layer is porous, it is liable to be corroded by such corrosive substances as chlorine contained in the solder. When the iron plating layer is corroded locally, the underlying solder iron proper of copper is exposed. As the result, Cu of the soldering iron reacts with Sn in the solder and inflicts a damage upon the tip so heavily as to render the soldering iron unusable.

This explains why, in the conventional soldering iron tip, the soldering iron proper of copper is protected with the iron plating layer. The service life of the soldering iron proper ranges from 2 to 3 days to 1 week, which is hardly called sufficiently long. The soldering iron, therefore, must undergo frequent replacement of the tip.

The replacement of the tip is a work which requires unusual advertence in setting the central position. Particularly, the soldering iron to be used for precision machines is required to be accurately positioned in the tip thereof. In the circumstances, improving the corrosion resistance and durability of the tip and decreasing the frequency of the work of replacement has been desired.

OBJECTS AND SUMMARY OF THE INVENTION

An object of this invention is to provide a soldering iron tip which has high affinity for molten solder and permits the work of soldering to be performed efficiently.

Another object of this invention is to provide a soldering iron tip excellent in corrosion resistance and durability.

The soldering iron tip embodying this invention has the leading end thereof covered with a coating layer of amorphous metal exhibiting highly satisfactory wettability in molten solder. The soldering iron tip as another embodiment of this invention has the leading end part thereof covered with a coating layer of amorphous metal exhibiting low wettability in molten solder and further has the amorphous metal coating layer on the leading end part thereof covered with a coating layer of material excelling in wettability in molten solder.

The term "amorphous metal" as used in the present specification refers to a simple metal and to an alloy as well.

DETAILED DESCRIPTION OF THE PREFERRED EMBODIMENTS

Now, preferred embodiments of the invention will be described below with reference to the accompanying drawings.

The soldering iron tip proper to be used in any of the preferred embodiments described below is similar in shape to the conventional soldering iron tip.

Figure 1:
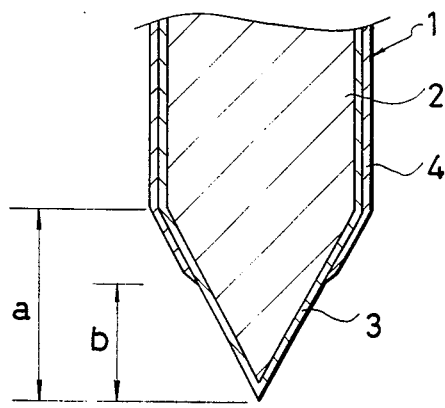
FIG. 1, FIG. 2, FIG. 3, FIG. 4, and FIG. 5 are cross sections of soldering iron tips of this invention.

A soldering iron tip 1 illustrated in FIG. 1 is produced by covering the surface of at least the leading end and its vicinity of a soldering iron tip proper 2 made of oxygen-free copper in the form of a soldering iron tip with a coating layer 3 of amorphous metal exhibiting highly satisfactory wettability in molten solder. Except for the leading end destined to contact molten solder, the soldering iron tip is covered with a plating (coating layer) 4 of material such as, for example, hard chromium which exhibits poor wettability in molten solder. Optionally, the chromium plating may be substituted with a coating of amorphous metal of low wettability in molten solder.

Figure 2:
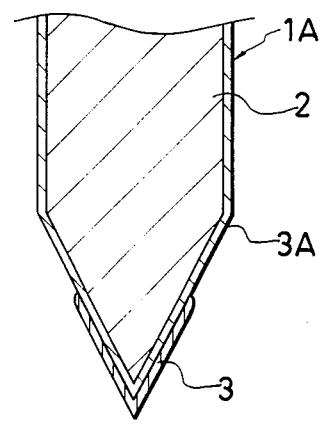

A soldering iron tip 1A illustrated in FIG. 2 is produced by covering the surface of at least the leading end and its vicinity of a soldering iron tip proper 2 with a coating layer 3A of amorphous metal exhibiting low wettability in molten solder. The leading end of the soldering iron tip destined to contact molten solder is only covered with a coating layer 3 of amorphous metal exhibiting highly satisfactory wettability in molten solder.

Figure 3:
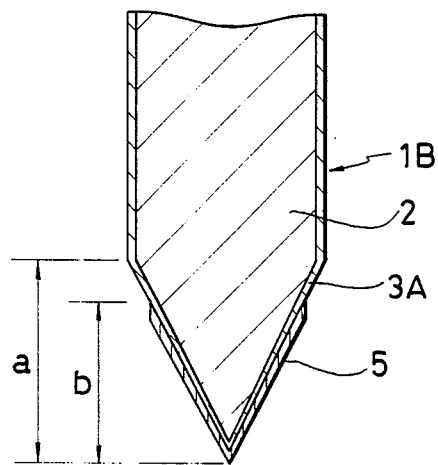

A soldering iron tip 1B illustrated in FIG. 3 is produced by covering the surface of at least the leading end and its vicinity of a soldering iron tip proper 2 made of oxygen-free copper with a coating layer 3A of amorphous metal exhibiting low wettability in molten solder. The leading end part of the soldering iron tip destined to contact molten solder is only covered with a plating (coating layer) 5 of a material such as, for example, pure iron exhibiting satisfactory wettability in molten solder.

Figure 4:
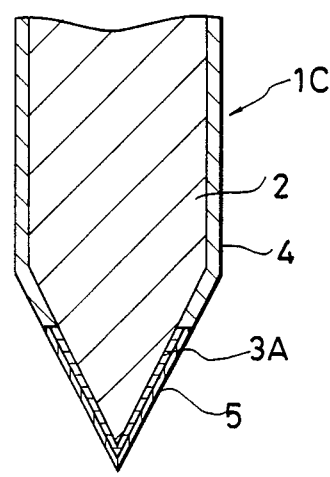

A soldering iron tip 1C illustrated in FIG. 4 is produced by covering only the leading end part of a soldering iron tip proper 2 destined to contact molten solder with a coating layer 3A of amorphous metal exhibiting low wettability in molten solder. This coating layer 3A is covered with a plating 5 of metal such as, for example, pure iron exhibiting satisfactory wettability in molten solder. The remaining surface of the soldering iron tip proper is covered with a plating 4 of a material such as, for example, chromium exhibiting low wettability in molten solder.

The expression "leading end part of the soldering iron tip destined to contact molten solder" as used in the present invention refers to the working edge necessary for the soldering. The width, for example, of the leading end part may be suitably decided in accordance with the nature of the work of soldering to be performed. Generally, the coating layer 3 of highly satisfactory wettability is formed on not more than 90%, especially not more than 70%, desirably not more than 60%, and particularly desirably not more than 50%, inclusive of the leading end side, of the convering surfaces of the soldering iron tip proper 2 describing a pointed tip in cross section. The percentages mentioned above represent the ratio, b/a, of length between the converging part and the covered part in the longitudinal direction of the soldering iron tip proper.

The soldering iron tips 1, 1A illustrated in FIG. 1 and FIG. 2 possess highly satisfactory workability in the soldering operation and pre-eminently excels in corrosion resistance because their leading end parts are both formed of amorphous metal exhibiting highly satisfactory wettability in molten solder. No molten solder creeps up these soldering iron tips because their surfaces except for the leading end parts are covered with a chromium plating 4 and a coating layer 3A of amorphous metal exhibiting poor wettability in molten solder respectively.

The soldering iron tips 1B, 1C illustrated in FIG. 3 and FIG. 4 exhibit highly satisfactory workability in the soldering operation because their leading end parts are made of a material exhibiting highly satisfactory wettability in molten solder. They are truly excellent in corrosion resistance because these leading end parts are under coated by a coating layer of amorphous metal. No molten solder creeps up these soldering iron tips because their surface except for the leading end parts are covered with a coating layer 3A of amorphous metal exhibiting poor wettability in molten solder and a chromium plating 4.

The amorphous metal to be used in this invention having satisfactory wettability in molten solder has to exhibit wettability equivalent to or better than the wettability of pure iron. The amorphous metal which is used in this invention having only poor wettability in molten solder has only to exhibit wettability equivalent to or worse than the wettability of chromium. Materials not amorphous and excellent in wettability in molten solder include gold and silver other than iron. From the economic point of view, it is desirable to use iron. The materials not amorphous and poor in wettability in molten solder include stainless steel, aluminum, and ceramics (such as, for example, aluminum oxide, silicon carbide, and silicon nitride), for example.

The thickness of the coating layer 3 of amorphous metal in the embodiments of FIG. 1 and FIG. 2 and the thickness of the coating layer 3A of amorphous metal in the embodiments of FIG. 3 and FIG. 4 are not particularly restricted. If their thicknesses are unduly small, the coating layers fail to exhibit sufficient corrosion resistance. Conversely, if they are unduly large, they entail the problem of film separation, for example. For the present invention, therefore, the thicknesses of the coating layers of amorphous metal are suitably selected approximately in the range of 0.1 to 10 $\mu$m, depending on the purpose for which the soldering iron tips are used.

The coating layer of amorphous metal contemplated by this invention can be easily formed by spattering, for example. The soldering iron tip proper 2 is made of a good heat conductor and is tapered toward the leading end side as illustrated and is provided on the end rear end side with a heater (not shown). The good heat conductors include copper and copper alloys, for example. The best heat conductor is oxygen-free copper.

The soldering iron tips illustrated in the accompanying drawings are preferred embodiments of this invention. This invention need not be limited to the illustrated embodiments but may be practised otherwise without departing from the spirit of the invention.

Figure 5:
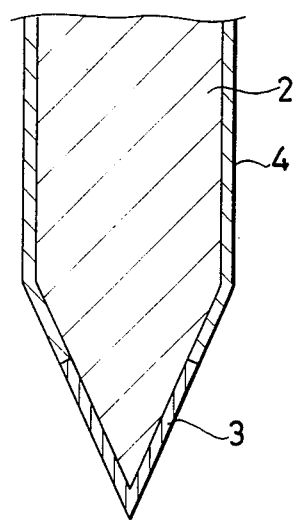
Figure 6:
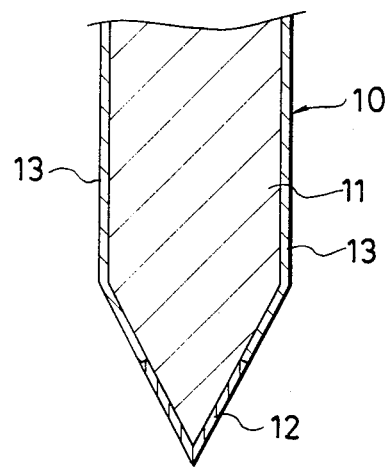
FIG. 6 is a cross section illustrating a conventional soldering iron tip.

In the preferred embodiment of FIG. 2, for example, the part denoted by the reference numeral 3A is not always required to be made of amorphous metal. It may be made of metal, alloy, or other material exhibiting low wettability in molten solder. It is even permissible to cover the leading end of the soldering iron tip with a coating layer 3 of amorphous metal excelling in wettability in molten solder and, at the same time, the surface except for the leading end is covered with a coating layer 4 (which may be substituted with an amorphous layer 3A) of material low in wettability in molten solder so as to form all of the coating layers in one continuous layer as illustrated in FIG. 5.

Further in the preferred embodiment of FIG. 3, a coating layer of metal, alloy, or other material poor in wettability in molten solder may be formed on the coating layer 3A of amorphous metal formed to cover the surface except for the leading end part.

As universally known, the amorphous metal possesses the following outstanding features which are not found in the conventional metals and alloys:

(1) It exhibits extremely high corrosion resistance.
(2) It is high in rigidity.
(3) It exhibits high mechanical strength and excels in toughness.

The soldering iron tip in one of the preferred embodiments of this invention has the leading end part thereof covered with a coating layer of amorphous metal enjoying such outstanding features as excellent corrosion resistance and exhibiting satisfactory wettability in molten solder, i.e. permitting steady adhesion of molten solder. Thus, it possesses good workability in the soldering operation, enjoys notable improvement in durability, and offers a notably elongated service life.

The soldering iron tip in another preferred embodiment of this invention has at least the leading end part thereof covered with a coating layer of amorphous metal low in wettability in molten solder and has the surface of the leading end part covered with a material satisfactory in wettability in molten solder and, therefore, it enjoys high workability in the soldering operation. Even when the coating layer formed on the leading end is corroded with molten solder, the underlying coating layer of amorphous metal low in wettability is capable of infallibly protecting the soldering iron tip proper. Thus, this soldering iron tip exhibits notably improved durability and offers a notably elongated service life.

Since the soldering iron tip of the present invention preeminently excels in corrosion resistance and durability and offers a long service life, it permits a notable decrease in frequent replacement of the soldering iron tip and enhances the operational efficiency of soldering.

The soldering iron tip of the present invention retains its serviceability for a long time exceeding one month or more.

A typical composition of the amorphous alloy which is used in this invention because of its highly satisfactory wettability in molten solder is as follows: An alloy composed of either or both of Ta and Nb in a total concentration in the range of 15 to 85 atomic percent and the balance substantially of Cu.

Typical compositions of the amorphous alloy which is used in this invention because of its poor wettability in molten solder are as shown below in (1), (2), and (3).

(1)

Ta: 30 to 60 atomic percent
Fe: 30 to 50 atomic percent
Ni: 3 to 7 atomic percent
Cr: 7 to 15 atomic percent (2)

W: 10 to 75 atomic percent
Fe: 30 to 50 atomic percent
Ni: 3 to 10 atomic percent
Cr: 7 to 20 atomic percent (3)

Ti: 10 to 75 atomic percent
Fe: 30 to 50 atomic percent
Ni: 3 to 10 atomic percent
Cr: 7 to 20 atomic percent The solder to be used in the present invention may be any of the conventional solders of ordinary compositions. Specifically, the solders of the Pb—Sn type compositions may be cited.

What is claimed is:

1. A soldering iron tip, comprising a soldering iron tip proper made of a good heat conductive material in the form of a soldering iron tip, a coating layer of amorphous metal exhibiting highly satisfactory wettability in molten solder at least equivalent to that of pure iron, said amorphous metal being formed on a surface of a leading end part of said soldering iron tip proper destined to contact molten solder, and a coating layer of amorphous metal exhibiting low wettability in molten solder at most equivalent to that of chromium, said coating layer low in wettability being formed on the coating layer of amorphous metal satisfactory in wettability in a region except for the leading end part of the soldering iron tip and consisting essentially of 30-60 atomic % of Ta, 30-50 atomic % of Fe, 3-7 atomic % of Ni and 7-15 atomic % of Cr.

2. A soldering iron tip according to claim 1, wherein a layer of material of poor wettability in molten solder is formed on said leading end part between said coating layer of amorphous metal satisfactory in wettability in molten solder and said soldering iron tip proper.

3. A soldering iron tip according to claim 1, wherein the thickness of said amorphous coating layer of good wettability is in the range of 0.1 to 10 micron.

4. A soldering iron tip, comprising a soldering iron tip proper made of a good heat conductive material and formed in the shape of a soldering iron tip, a coating layer of amorphous metal low in wettability in molten solder at most equivalent to that of chromium, said coating layer being formed on a surface of said soldering iron tip proper at a region adjoining at least a leading end part of said soldering iron tip proper and its vicinity destined to contact molten solder, said coating layer of amorphous metal low in wettability consisting essentially of 30-60 atomic % of Ta, 30-50 atomic % of Fe, 3-7 atomic % of Ni and 7-15 atomic % of Cr, and a second coating layer of satisfactory wettability in molten solder superposed on a surface of said coating layer at said leading end part destined to contact molten solder, said second coating layer having excellent wettability relative to molten solder at least equivalent to that of pure iron.

5. A soldering iron tip according to claim 4, wherein said coating layer excellent in wettability in molten solder is a coating layer of amorphous metal at least equivalent to that of pure iron.

6. A soldering iron tip according to claim 4, wherein said coating film excellent in wettability in molten solder is a plating of pure iron.

7. A method of preventing corrosion of soldering iron tip, comprising,
preparing an amorphous metal having low wettability relative to molten solder at most equivalent to that of chromium, said amorphous metal consisting essentially of 30-60 atomic % of Ta, 30-50 atomic % of Fe, 3-7 atomic % of Ni and 7-15 atomic % of Cr,
covering the soldering iron with said amorphous metal so that corrosion of the soldering iron is substantially prevented and
covering the amorphous metal with a coating layer having satisfactory wettability in molten solder at a leading end part destined to contact molten solder.

8. A soldering iron tip, comprising,
a soldering iron tip proper made of a good heat conductive material and formed in the shape of a soldering iron tip,
a first coating layer of amorphous metal low in wettability in molten solder at most equivalent to that of chromium, said first coating layer being formed on a surface of the leading end part of said soldering iron tip proper destined to contact molten solder and consisting essentially of 30-60 atomic % of Ta, 30-50 atomic % of Fe, 3-7 atomic % of Ni and 7-15 atomic % of Cr,
a second coating layer formed of pure iron on said first coating layer, and
a third coating layer formed of a material low in affinity for molten solder and provided on a surface of said soldering iron tip proper in the region contiguous to said leading end part.

* * * * *